(12) United States Patent
Li et al.

(10) Patent No.: US 10,285,181 B2
(45) Date of Patent: May 7, 2019

(54) CONFIGURATION OF COEXISTENCE OF DIFFERENT CP LENGTHS IN D2D COMMUNICATION

(71) Applicant: Sharp Kabushiki Kaisha, Sakai, Osaka (JP)

(72) Inventors: Bo Li, Shanghai (CN); Qi Jiang, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/309,287

(22) PCT Filed: Apr. 24, 2015

(86) PCT No.: PCT/CN2015/077365
§ 371 (c)(1),
(2) Date: Nov. 7, 2016

(87) PCT Pub. No.: WO2015/169156
PCT Pub. Date: Nov. 12, 2015

(65) Prior Publication Data
US 2017/0079026 A1 Mar. 16, 2017

(30) Foreign Application Priority Data
May 8, 2014 (CN) .......................... 2014 1 0192888

(51) Int. Cl.
*H04L 5/00* (2006.01)
*H04W 8/00* (2009.01)
(Continued)

(52) U.S. Cl.
CPC ......... *H04W 72/048* (2013.01); *H04L 5/0062* (2013.01); *H04W 8/005* (2013.01);
(Continued)

(58) Field of Classification Search
CPC .......... H04W 72/048; H04W 72/1215; H04W 48/12; H04W 72/042; H04W 8/005
See application file for complete search history.

(56) References Cited

U.S. PATENT DOCUMENTS

| 9,838,163 B2 * | 12/2017 | Kim ...................... H04L 1/1861 |
| 2014/0161095 A1 * | 6/2014 | Nan .................... H04W 76/023 370/330 |

(Continued)

FOREIGN PATENT DOCUMENTS

| WO | 2013/191522 A1 | 12/2013 |
| WO | 2015/064366 A1 | 5/2015 |

OTHER PUBLICATIONS

Samsung, "Discussion on CP Length for D2D PUSCH"; 3GPP TSG RAN WG1 Meeting #76bis; R1-141300; Mar. 31-Apr. 4, 2014; 6 pages.

(Continued)

*Primary Examiner* — Mohammad S Anwar
(74) *Attorney, Agent, or Firm* — Keating & Bennett, LLP

(57) ABSTRACT

The present disclosure discloses a plurality of configuration schemes for coexistence of D2D signals with different CP lengths in D2D communication. In Scheme 1-1, a network allocates a specific CP length for some kind of D2D channel of all users in a cell; in Scheme 1-2, the network configures a specific CP length for each of D2D channels of each user in the cell; in Scheme 2-1, the network configures one CP length for each of D2D subframes; in Schemes 2-2 to 2-4, the system configures a CP length periodically, in which for N D2D subframes within a configuration periodicity, the network configures one CP length for each of (N–M) (M=1, 2) D2D subframes; while for the remaining M (M=1, 2) D2D subframes, the system multiplexes SC-FDMA/OFDM symbols with different CP lengths in a TDM, a FDM, and a TDM & FDM ways, respectively; and in Scheme 2-5, the (Continued)

network configures one CP length for each allocated time-frequency physical resource set.

6 Claims, 6 Drawing Sheets

(51) Int. Cl.
*H04W 48/12* (2009.01)
*H04W 72/04* (2009.01)
*H04W 72/12* (2009.01)
*H04W 84/18* (2009.01)
*H04W 88/06* (2009.01)
*H04W 88/10* (2009.01)

(52) U.S. Cl.
CPC ........... *H04W 48/12* (2013.01); *H04W 72/04* (2013.01); *H04W 72/042* (2013.01); *H04W 72/1215* (2013.01); *H04W 72/1294* (2013.01); *H04W 84/18* (2013.01); *H04W 88/06* (2013.01); *H04W 88/10* (2013.01)

(56) References Cited

U.S. PATENT DOCUMENTS

| | | | |
|---|---|---|---|
| 2015/0110038 A1 | 4/2015 | Yang et al. | |
| 2015/0181587 A1 | 6/2015 | Yang et al. | |
| 2015/0264552 A1* | 9/2015 | Xiong | H04W 8/005 370/329 |
| 2016/0294595 A1 | 10/2016 | Harada et al. | |

OTHER PUBLICATIONS

Huawei, H.; "Co-existence of Normal CP OFDM Symbol and Extended CP OFDIM Symbol in D2D Communication/Discovery"; 3GPP TSG RAN WG1 Meeting #76b; Mar. 31-Apr. 4, 2014; R1-141591; 5 pages.

Intel Corporation; "On Resource Allocation for D2D Discovery"; 3GPP TSG RAN WG1; Meeting #76; R1-140133; Feb. 10-14, 2014; pp. 1-6.

Fujitsu; "Discussion on D2D Resource Allocation"; 3GPP TSG-RAN1#76bis; R1-141231; Mar. 31-Apr. 4, 2014; pp. 1-6.

* cited by examiner

① FIRST CATEGORY OF INTER-SYMBOL-SET INTERVAL
② SECOND CATEGORY OF INTER-SYMBOL-SET INTERVAL

CONFIGURATION OF COEXISTENCE OF DIFFERENT CP LENGTHS IN D2D COMMUNICATION

TECHNICAL FIELD

The present disclosure relates to the field of mobile communication, and in particular, to a configuration of coexistence of D2D signals with different CP (Cyclic Prefix) lengths in a D2D communication system, and a corresponding anti-interference scheme.

BACKGROUND

D2D (Device to Device) technology refers to a communication approach in which direct communication is performed between two peer-to-peer user nodes. Direct-connect communication technology is applied importantly in a lot of areas where 3GPP has not standardized yet currently, including P2P (Peer to Peer) in a non-cellular operation mode Ad hoc which has been studied by the academic world continuously in recent years, and M2M (Machine to Machine) in IoT (Internet of Things) which is a killer application that has always had great potential business requirements. In such a centralized or distributed network composed of D2D users, each user node can transmit and receive signals and may have a function of automatic routing (forwarding messages). Physical resources used for carrying communication may be configured by the network or may be obtained by competition between respective direct-communication communication terminals. It is a novel idea to enable UEs (user equipments) in a cellular system to communicate with each other directly without being switched over by a base station. Obviously, natural attenuation characteristics of a mobile propagation environment and lower transmission antennas of the user enable two UEs which directly communicate with each other to have a relatively small interference region. In this scenario, the users between which physical isolation (such as a degree of signal attenuation) reaches a certain degree can share the same resources (space, time, frequency, codeword, etc.), without causing severe interference with each other. Intuitively, there may be a considerable number of users in each cell for the direct-connect communication, and introduction of the direct-connect communication technology in the cellular network may greatly improve space reuse efficiency of system resource, which may greatly relief pressure of scheduling network resources. Also, these D2D services are carried out under the configuration of the network, which is not only effective supplement to the existing cellular system making more efficient use of air interface resources, but also can incorporate various physical devices into the connection system, so that services, such as IoT, IoV (Internet of Vehicles), may be possibly implemented in the 3GPP cellular network framework. At the same time, since the cellular service can only run in a coverage area of the cellular network, and in an area without network coverage, the D2D service can work independently without the help of the base station, this can provide powerful means of rescuing in a timely manner for a disaster area (such as complete network paralysis caused by e.g. earthquake, flood etc.), which is a very powerful supplement to the existing cellular service. In view of this, the 3GPP has been promoting standardization of the D2D communication. As early as the beginning of 2013 in Malta RAN1 $72^{nd}$ meeting, 3GPP has decided to study on the D2D technology, and the $63^{rd}$ plenary session of RAN hold in March 2014 at Fukuoka adopted a work issue of standardization of D2D services in LTE Rel-12. The LTE Rel-12 standard will support D2D services, and the present disclosure will address a problem of inter-symbol interference caused by coexistence of signals with different CP formats which are inevitably encountered.

SUMMARY

Objects of the present disclosure is to provide anti-interference technology for coexistence of D2D signals with different CP lengths in the D2D communication system, and a whole set of mechanisms configured at a corresponding physical layer and upper layers, as well as effects on 3GPP standardization. The present disclosure lists several schemes of resisting interference caused by coexistence of different CP lengths, which are applicable to various scenarios of coexistence of signals with different CP lengths in the D2D communication.

In particular, in order to solve a problem of interfered traffic being unable to be communicated normally which is caused by inter-symbol interference due to coexistence of the signals with different CP lengths at one and the same air interface when D2D service is scheduled, the present disclosure designs several mechanisms, and particularly discloses two configuration schemes for coexistence of the D2D signals with different CP lengths, each of the configuration schemes having two to four different sub-schemes possibly used. In Scheme 1-1, the network allocates a resource pool with a specific CP format to some kind of D2D channel of all users in a cell; in Scheme 1-2, the network allocates one specific CP length to each kind of D2D channels of each user; in Scheme 2-1, the network allocates one CP length to each D2D subframe, and it is not allowed to multiplex signals with different CP lengths in one and the same subframe; in Scheme 2-2, the system configures CP lengths periodically, in which for N D2D subframes within a configuration periodicity, the network configures one CP length for each of (N−M) D2D subframes, while the system multiplexes SC-FDMA/OFDM symbols with different CP lengths in a TDM (Time Division Multiplexing) way for the remaining M (M=1, 2) D2D subframes, wherein the most typical scheme is configuring a different CP length for each SC-FDMA/OFDM symbol by the system; in Scheme 2-3, the system configures CP lengths periodically, in which for N D2D subframes within the configuration periodicity, the network configures one CP length for each of (N−M) D2D subframes, while the system multiplexes CP subframes with different lengths in a FDM (Frequency Division Multiplexing) way for the remaining M (M=1, 2) D2D subframes, wherein the most typical scheme is configuring a different CP length for each PRB of the mixed subframe by the system; in Scheme 2-4, the system configures CP lengths periodically, in which for N D2D subframes within the configuration periodicity, the network configures one CP length for each of (N−M) D2D subframes, while the system multiplexes CP subframes with different lengths in a TDM&FDM way for the remaining M (M=1, 2) D2D subframes, wherein the most typical scheme is configuring a different CP length for each SC-FDMA/OFDM symbol within the mixed subframe or for each sub-carrier set within each symbol group by the system; in Scheme 2-5, the network configures one CP length for each allocated time-frequency physical resource set.

In addition, the above Schemes 1-1, 1-2, 2-1, 2-2, 2-3 and 2-5 involve physical layer processes as follows:

1. For Schemes 1-1 and 1-2, the network may configure the corresponding configurations as previously described by high-layer signaling. These configurations may be notified to a D2D transmission terminal and a D2D reception terminal. The D2D transmission terminal related to the configurations may use the CP formats configured by the network for the D2D signals which are transmitted on the corresponding subframe set of the D2D transmission terminal; and the D2D reception terminal related to the configurations may use the CP formats obtained from the network notification for corresponding reception signal detection.

2. For Scheme 2-1, the network may configure the corresponding configurations as previously described by the high-layer signaling. These configurations may be notified to the D2D transmission terminal and the D2D reception terminal. The D2D transmission terminal related to the configurations may use the CP formats configured by the network for the D2D signals which are transmitted on the corresponding subframe set of the D2D transmission terminal; and the D2D reception terminal related to the configurations may use the CP formats obtained from the network notification for corresponding reception signal detection; in a word, on these subframe sets grouped based on the CP formats, both the D2D transmission terminal and the D2D reception terminal must restrict their D2D transmission and reception behaviors according to the corresponding CP format configured on the subframe or subframe set.

3. For Schemes 2-2, 2-3, 2-4 and 2-5, a long CP subframe set, a short CP subframe set, a subframe number of a mixed subframe or corresponding mixed subframe configuration information are required to be configured by the high layer signaling or DCI configuration. Of course, the corresponding mixed subframe configuration information is notified by RRC or informed on a SA channel.

4. Rate Match. When a short CP and a long CP are multiplexed in the mixed subframe, a corresponding rate match approach needs to be modified if they are multiplexed in the TDM way.

5. For the mixed subframe in which the long CP and the short CP are coexisted in the TDM way in Scheme 2-2, and for the mixed subframe in which the long CP and the short CP are coexisted in the FDM way in Schemes 2-2, 2-3 and 2-4, the system may inform in the RRC signaling corresponding resource of one CP subframe set and corresponding configuration of the mixed subframe.

In summary, the present disclosure generally provides a method of performing CP configurations on resources of D2D communication, and a corresponding base station. The method comprises: configuring, by a base station, CP formats for different resource subsets, the CP formats including a long CP signal format and a short CP signal format; and notifying, by the base station, the configuration to a D2D transmission device and a D2D reception device, wherein the configuration notified by the base station to the D2D transmission device and the D2D reception device comprises: a configuration of a CP format used by a resource pool of a D2D discovery channel of the D2D transmission device; and a configuration of a CP format used by a resource pool of a D2D communication channel of the D2D transmission device; and wherein the D2D transmission device and the D2D reception device perform transmission and reception in the resource subsets with the CP formats which comply with the configuration.

The configuration is notified via high layer RRC signaling, a SIB message or DCI.

In particular, corresponding to Scheme 1-1, the base station configuring by the CP formats for different resource subsets comprises: configuring, by the base station, resource pools occupied by respective D2D channels and the CP formats corresponding to the respective resource pools. Notifying by the base station the configuration to the D2D transmission device and the D2D reception device comprises: notifying, by the base station, time-frequency resources contained in the resource pools of the respective D2D channels and the CP formats corresponding to the respective resource pools.

Corresponding to Scheme 1-2, configuring by the base station the CP formats for different resource subsets comprises: configuring, by the base station, a short CP resource pool allocated for one of respective D2D channels and a long CP resource pool allocated for the D2D channel. Notifying by the base station the configuration to the D2D transmission device and the D2D reception device comprises: notifying by the base station to respective D2D terminals CP formats of the respective D2D channels and resource pools occupied by the D2D channels of the respective CP formats of the D2D terminal in the cell.

Corresponding to Scheme 2-1, configuring by the base station the CP formats for different resource subsets comprises: configuring, by the base station, two subframe sets and different CP formats used by the respective subframe sets. Notifying by the base station the configuration to the D2D transmission device and the D2D reception device comprises: notifying, by the base station, time-frequency resources contained in the two subframe sets and the different CP formats respectively corresponding to the two subframe sets.

Corresponding to Scheme 2-2, configuring by the base station the CP formats for different resource subsets comprises: configuring, by the base station, two subframe sets and one or two mixed subframes, different CP formats respectively used by the two subframe sets, and how the one or two mixed subframes use the different CP formats in a Time Division Multiplexing TDM way. notifying by the base station the configuration to the D2D transmission device and the D2D reception device comprises: notifying, by the base station, time-frequency resources contained in the two subframe sets, the different CP formats respectively corresponding to the two subframe sets, subframe numbers of the one or two mixed subframes, and a number of and positions of SC-FDMA or OFDM symbols corresponding to different CP formats in the one or two mixed subframes.

Corresponding to Scheme 2-3, configuring by the base station the CP formats for different resource subsets comprises: configuring, by the base station, two subframe sets and one or two mixed subframes, different CP formats respectively used by the two subframe sets, and how the one or two mixed subframes use the different CP formats in a Frequency Division Multiplexing FDM way. Notifying by the base station the configuration to the D2D transmission device and the D2D reception device comprises: notifying, by the base station, time-frequency resources contained in the two subframe sets, the different CP formats respectively corresponding to the two subframe sets, subframe numbers of the one or two mixed subframes, and a number of, positions of and power information of physical resource blocks corresponding to different CP formats in the one or two mixed subframes, and a number of and positions of physical resource blocks occupied by guard bands in the mixed subframes.

Corresponding to Scheme 2-4, configuring by the base station the CP formats for different resource subsets comprises: configuring, by the base station, two subframe sets and one or two mixed subframes, different CP formats respectively used by the two subframe sets, and how the one or two mixed subframes use the different CP formats in a Time Division Multiplexing TDM and Frequency Division Multiplexing FDM way. Notifying by the base station the configuration to the D2D transmission device and the D2D reception device comprises: notifying, by the base station, time-frequency resources contained in the two subframe sets, the different CP formats respectively corresponding to the two subframe sets, subframe numbers of the one or two mixed subframes, a number of SC-FDMA or OFDM symbol sets in the one or two mixed subframes, a number of, positions of and power information of SC-FDMA or OFDM symbols and sub-carriers corresponding to different CP formats in each SC-FDMA or OFDM symbol set, and a number of and positions of sub-carriers occupied by guard bands in one and the same SC-FDMA or OFDM symbol set of the mixed subframe.

Corresponding to Scheme 2-5, configuring by the base station the CP formats for different resource subsets comprises: configuring, by the base station, two time-frequency physical resource sets and different CP formats respectively used by the two time-frequency physical resource sets. Notifying by the base station the configuration to the D2D transmission device and the D2D reception device comprises: notifying, by the base station, time-frequency resources contained in the two time-frequency physical resource sets, and different CP formats, power information and corresponding positions of guard bands corresponding to the two time-frequency physical resource sets.

BRIEF DESCRIPTION OF THE DRAWINGS

In order to illustrate the objects, technical solutions and advantages of the present disclosure more clearly, particular embodiments of the present disclosure will be described in detail with reference to the drawings, in which FIG. 1 illustratively shows a subframe format diagram according to Scheme 1-1 of the present disclosure, in which a resource pool of some specific CP format is allocated to some kind of D2D channel of all users in a cell.

DETAILED DESCRIPTION

Hereinafter, preferred embodiments of the present disclosure will be described in detail with reference to the drawings. Details and functions which are not necessary to implement the present disclosure are omitted in the description so as to avoid obscuring the present disclosure.

Firstly, configuration schemes 1-1 to 2-5 of coexistence of D2D signals with two CP lengths proposed by the present disclosure will be described with reference to FIGS. 1 to 9.

Implementation 1-1

In Implementation 1-1, the base station configures a resource pool and a CP format thereof semi-statically for each kind of specific D2D channel, which comprise:

1. a resource pool occupied by the D2D channel;
2. a CP format of the resource pool occupied by the D2D channel.

Figure 1:
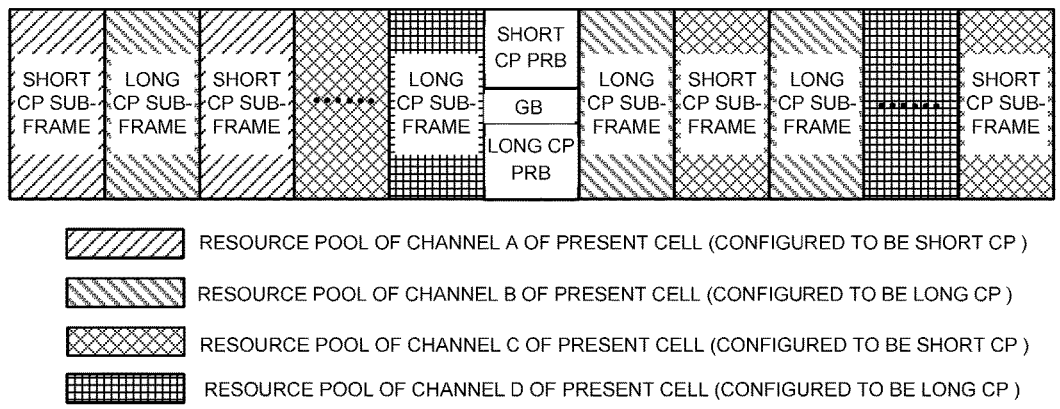

The subframe structure of this scheme is shown in FIG. 1, in which the base station allocates a resource pool of some specific CP format for some kind of D2D channel of all users in the cell.

Hence, when the base station notifies, via RRC signaling, the D2D terminals of the subframe sets configured by the base station, it also needs to notify the D2D terminals of CP lengths of these subframe sets. As such, signaling for the subframe set configuration of the base station comprises:

1. time and frequency resources occupied for a resource pool of D2D Channel A of all D2D users in the present cell, and a CP configuration format of the resource pool;
2. time and frequency resources occupied for a resource pool of D2D Channel B of all D2D users in the present cell, and a CP configuration format of the resource pool;
3. time and frequency resources occupied for a resource pool of D2D Channel C of all D2D users in the present cell, and a CP configuration format of the resource pool;
4. time and frequency resources occupied for a resource pool of D2D Channel D of all D2D users in the present cell, and a CP configuration format of the resource pool; and so on.

As shown in FIG. 1, the base station will configure a uniform and unique CP format for each kind of D2D channel in this scheme. Signals on some D2D channel corresponding to different D2D terminals are invoked on the resource pool configured to the D2D channel of the present cell, and all of terminals of D2D mode 1 in coverage of the base station may use the CP format configured by the base station for the channel. For example, a resource pool and a uniform and unique CP format of the resource pool are configured for a discovery channel of all D2D terminals in the cell; or a resource pool and a uniform and unique CP format of the resource pool are configured for a resource assignment channel (SA channel) of some D2D terminal in the cell.

It should be noted that in Implementation 1-1, the base station allocates a specific CP format to each kind of D2D channel, but the D2D channel is multiplexed by respective D2D users in the cell; and the resource pool allocated for the D2D channel and resource pools allocated for other D2D channels are multiplexed in a TDM way or in a FDM way or in a TDM&FDM way. Any of multiplexing ways falls into the protection scope of the present disclosure, as long as the base station determines a specific CP format for the resource pool of each kind of D2D channel.

It should be further noted that Implementation 1-1 may be implemented in two configuration schemes. A first configuration scheme is using a uniform CP format in the cell for the same kind of D2D channel in the same cell, as described previously. A second configuration scheme is containing two resource pool subsets in the resource pool of the same D2D channel in the same cell, these two resource pool subsets using different CP formats, the D2D channel for each user being carried on the resource pool subset of one of the CP formats, and some D2D channel for the same user being carried across the resource pool subsets of different CP formats being not allowed.

Implementation 1-1 involves physical layer processes as follows:

The network may configure the corresponding configurations, such as the resource pools of respective D2D channels in the cell, and the CP formats of respective kinds of D2D channels in the cell, as previously described via high layer RRC signaling or SIB message broadcast. Since the message is commonly used in the coverage of the whole cell, these configurations may be notified to a D2D transmission terminal and a D2D reception terminal in a broadcast way or other possible ways.

The D2D transmission terminal associated with the configuration may use the CP format configured by the network for the D2D signal transmitted on the corresponding resource pool.

The D2D reception terminal associated with the configuration may use the CP format obtained from the network notification for corresponding detection of the received signal.

In a word, on these resource pools of specific CP formats, both the D2D transmission terminal and the D2D reception terminal must restrict their D2D transmission and reception behaviors according to the CP formats configured on the corresponding subframe or subframe set.

Implementation 1-2

In Implementation 1-2, the base station configures resource pools and CP formats thereof semi-statically for each kind of specific D2D channel, which comprise:

1. a short CP resource pool allocated for some D2D channel in the present cell;

2. a long CP resource pool allocated for some D2D channel in the present cell.

Figure 2:
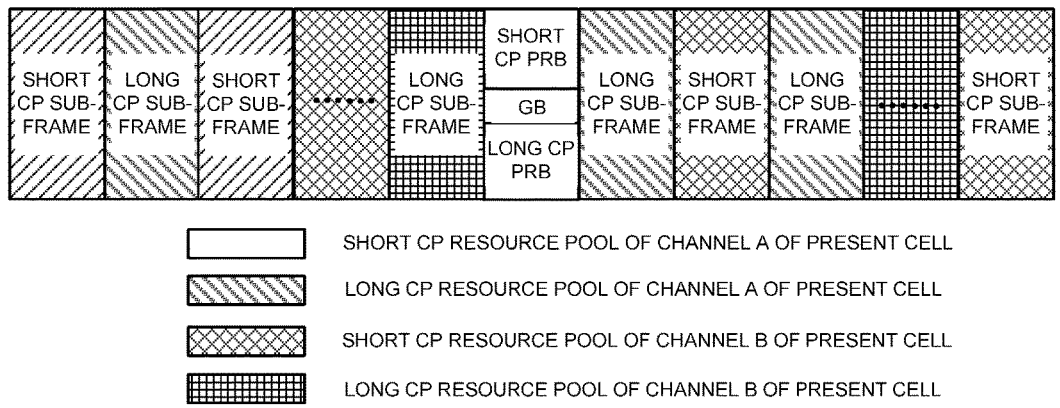
FIG. 2 illustratively shows a subframe format diagram according to Scheme 1-2 of the present disclosure, in which a resource pool of some specific CP format is allocated to some kind of D2D channel of some user in a cell.

The subframe structure of this scheme is shown in FIG. 2, in which the base station allocates a resource pool of some specific CP format for some kind of D2D channel of some user in the cell.

Hence, when the base station notifies, via RRC signaling, the D2D terminals of the subframe sets configured by the base station, it also needs to notify the D2D terminals of CP lengths of these subframe sets. As such, signaling for the subframe set configuration of the base station comprises:

1. time and frequency resources occupied for a short CP resource pool of D2D Channel A of the present cell, and a CP configuration format of the resource pool;

2. time and frequency resources occupied for a long CP resource pool of D2D Channel A of the present cell, and a CP configuration format of the resource pool;

3. time and frequency resources occupied for a short CP resource pool of D2D Channel B of the present cell, and a CP configuration format of the resource pool;

4. time and frequency resources occupied for a long CP resource pool of D2D Channel B of the present cell, and a CP configuration format of the resource pool; and so on.

As shown in FIG. 2, the base station will configure a specific CP format for each kind of D2D channel of each D2D terminal in this scheme. Signals on some D2D channel corresponding to different D2D terminals are invoked on the short CP resource pool or the long CP resource pool configured to the D2D channel of the present cell, and all of terminals of D2D mode 1 in coverage of the base station may use the CP format configured by the base station for the D2D channel of the D2D terminal. For example, a discovery channel short CP resource pool and a discovery channel long CP resource pool are allocated for a discovery channel of all D2D terminals in the cell, and the discovery channel of some D2D terminal may be carried on one of the discovery channel short CP resource pool and the discovery channel long CP resource pool; or a SA channel short CP resource pool and a SA channel long CP resource pool are allocated for a SA channel of some D2D terminal, and the SA channel of some D2D terminal may be carried on one of the SA channel short CP resource pool and the SA channel long CP resource pool in the cell.

It should be noted that in Implementation 1-2, the base station allocates a specific CP format to each kind of D2D channel of each D2D terminal, but the D2D channel short (or long) CP resource pool is multiplexed by respective D2D users of the channels of different CP formats in the cell; and the short (or long) CP resource pool allocated for the D2D channel is multiplexed with the long (or short) CP resource pool allocated for the D2D channel or with the resource pools allocated for other D2D channels in a TDM way or in a FDM way or in a TDM&FDM way. Any of multiplexing ways falls into the protection scope of the present disclosure, as long as the base station determines a specific CP format for the resource pool of each kind of D2D channel.

It should be further noted that Implementation 1-1 may be implemented in the following configuration schemes: a specific D2D channel of each user in the cell is configured with some set of CP format resource pools of the D2D channel in the cell (the short CP resource pool of the D2D channel or the long CP resource pool of the D2D channel), i.e., some channel of some user in the cell can only be allocated to one of subset 1 or subset 2 of the resource pool of the channel, and resource allocation for the same channel of the same user is not allowed to be performed across the resource pool subsets 1 and 2.

Implementation 1-2 involves physical layer processes as follows:

The network may configure the corresponding configurations, such as the resource pools of respective D2D channels in the cell, and the CP formats of respective kinds of D2D channels in the cell, as previously described via the high layer RRC signaling or SIB message broadcast. Since the message is commonly used in the coverage of the whole cell, these configurations may be notified to the D2D transmission terminal and the D2D reception terminal in a broadcast way or other possible ways.

The D2D transmission terminal associated with the configuration may use the CP format configured by the network for the D2D signal transmitted on the corresponding resource pool.

The D2D reception terminal associated with the configuration may use the CP format obtained from the network notification for corresponding detection of the received signal.

In a word, on these resource pools of specific CP formats, both the D2D transmission terminal and the D2D reception terminal must restrict their D2D transmission and reception behaviors according to the CP formats configured on the corresponding subframe or subframe set.

Implementation 2-1

In Implementation 2-1, the base station configures subframe sets semi-statically for a D2D communication channel and a D2D discovery channel, which comprise:

1. a subframe set with a short CP;
2. a subframe set with a long CP.

Hence, when the base station notifies, via RRC signaling, the D2D terminals of the subframe sets configured by the base station, it also needs to notify the D2D terminals of CP lengths of corresponding subframe sets of these D2D terminals. As such, signaling for the subframe set configuration of the base station comprises:

1. time and frequency resources of subframe set 1, and a CP configuration format of the subframe set;
2. time and frequency resources of subframe set 2, and a CP configuration format of the subframe set.

Figure 3:
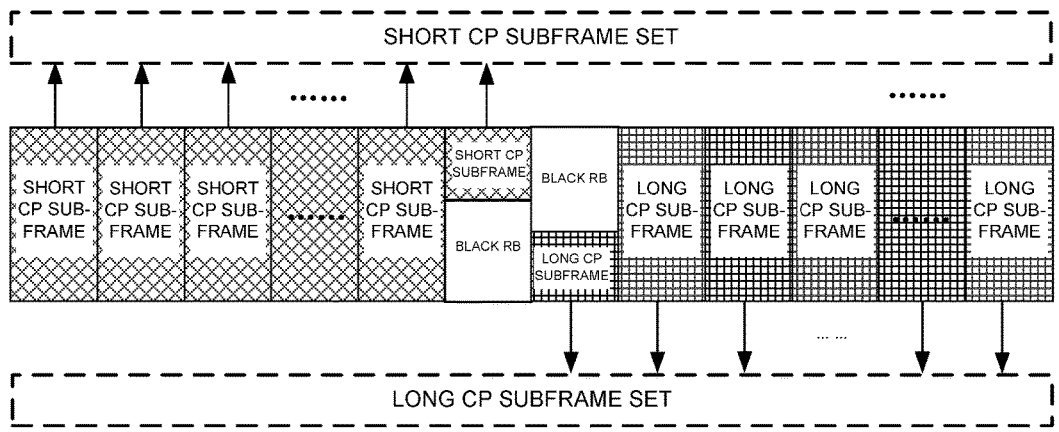
FIG. 3 illustratively shows a subframe format diagram according to Scheme 2-1 of the present disclosure, in which CP formats are configured based on respective subframe sets, and subframes are continuous in a subframe set of each kind of CP format.
Figure 4:
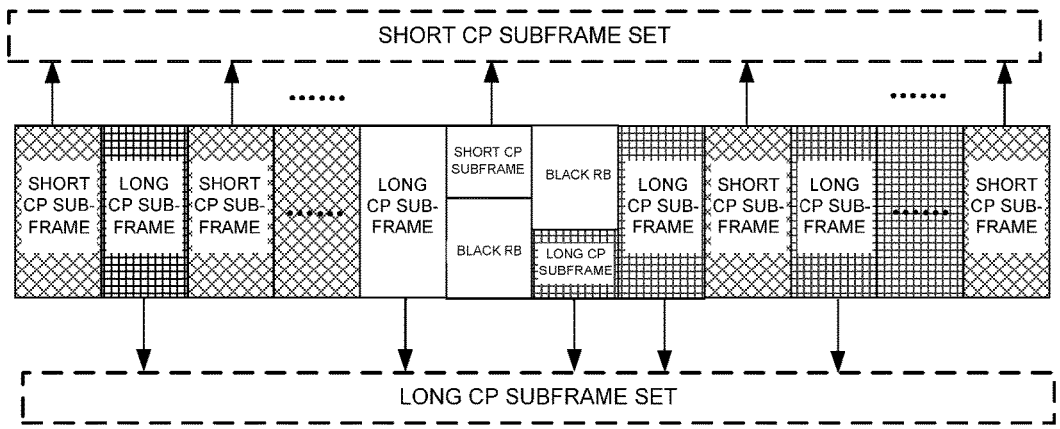
FIG. 4 illustratively shows a subframe format diagram according to Scheme 2-1 of the present disclosure, in which CP formats are configured based on respective subframe sets, and subframes are discontinuous in a subframe set of each kind of CP format.

The subframes in the subframe set of each CP format may be continuous as shown in FIG. 3, or may be discontinuous as shown in FIG. 4.

The signaling for the subframe set configuration of the base station may be one of the above signaling 1 and 2 or both.

The signaling may be transmitted to the D2D terminal by the base station in a form of dedicated RRC signaling, or may be broadcast in a form of SIB message. It is a good choice that a new SIB format is defined in D2D Specification for transmitting the information.

In addition, there may be three configuration schemes for Implementation 2-1. A first configuration scheme is universally configuring all of D2D channels in the cell, i.e., each kind of channel can only be allocated to one of a time-frequency physical resource block set 1 and a time-frequency physical resource block set 2. A second configuration scheme is dedicatedly configuring respective D2D channels of all D2D terminals in the cell, e.g., configuring a subframe set and a CP format of the subframe set for the discovery channel of all the D2D terminals in the cell, or configuring a subframe set and a CP format of the subframe set for the SA channel of all the D2D terminals in the cell, or configuring a time-frequency physical resource block set and a CP format of the time-frequency physical resource block set for the D2D transmission channel of all the D2D terminals in the cell, etc. The third configuration scheme is dedicatedly configuring respective D2D channels of respective D2D terminals in the cell, e.g., configuring a subframe set and a CP format of the subframe set for the discovery channel of some D2D terminal in the cell, or configuring a subframe set and a CP format of the subframe set for the SA channel of some D2D terminal in the cell, or configuring a time-frequency physical resource block set and a CP format of the time-frequency physical resource block set for the D2D transmission channel of some D2D terminal in the cell. In a word, some D2D channel of some D2D terminal can only be configured in one of the resource pools of two different CP formats of the D2D channel in the cell, and some D2D channel of some D2D terminal is not allowed to be carried across resource pools of different CP formats.

For the D2D transmitter, the resources for transmitting the signal are selected from the configured subframe set, and the CP format of the subframe set completely complies with such a configuration.

The D2D transmission terminal associated with the configuration may use the CP format configured by the network for the D2D signal transmitted on the corresponding subframe set; and the D2D reception terminal associated with the configuration may use the CP format obtained from the network notification for corresponding detection of the received signal.

The eNB should notify the D2D transmission terminal and the D2D reception terminal of these subframe sets and the CP format configuration information thereof, especially property of the subframe set of some critical channel, such as the SA channel and a D2D synchronization channel etc., in order to satisfy respective coverage requirements thereof as required.

For Scheme 2-1, continuous subframes may be selected from the configured subframe set as shown in FIG. 3, or discontinuous subframes may be selected from the configured subframe set as shown in FIG. 4.

Implementation 2-1 involves physical layer processes as follows:

The network may configure the corresponding configurations as previously described via the high layer RRC signaling, and these configurations may be notified to the D2D transmission terminal and the D2D reception terminal.

The D2D transmission terminal associated with the configuration may use the CP format configured by the network for the D2D signal transmitted on the corresponding subframe set.

The D2D reception terminal associated with the configuration may use the CP format obtained from the network notification for corresponding detection of the received signal.

In a word, on these subframe sets divided based on the CP formats, both the D2D transmission terminal and the D2D reception terminal must restrict their D2D transmission and reception behaviors according to the CP formats configured on the corresponding subframe or subframe set.

Regarding Implementation 2-1, since D2D and a cellular network cannot coexist in the same subframe, both D2D data and cellular network data generally won't right completely occupy all subframes of the same data type in a full-load condition without wasting any resource. Implementations 2-1 to 2-5 may maximize resource utilization.

Implementation 2-2

In this implementation, the base station configures subframe sets semi-statically for the D2D communication channel and the D2D discovery channel, which comprise:

1. a subframe set 1 with a short CP;
2. a subframe set 2 with a long CP;
3. a subframe in which one or two long CP signals and short CP signals coexist in a TDM form.

Figure 5:
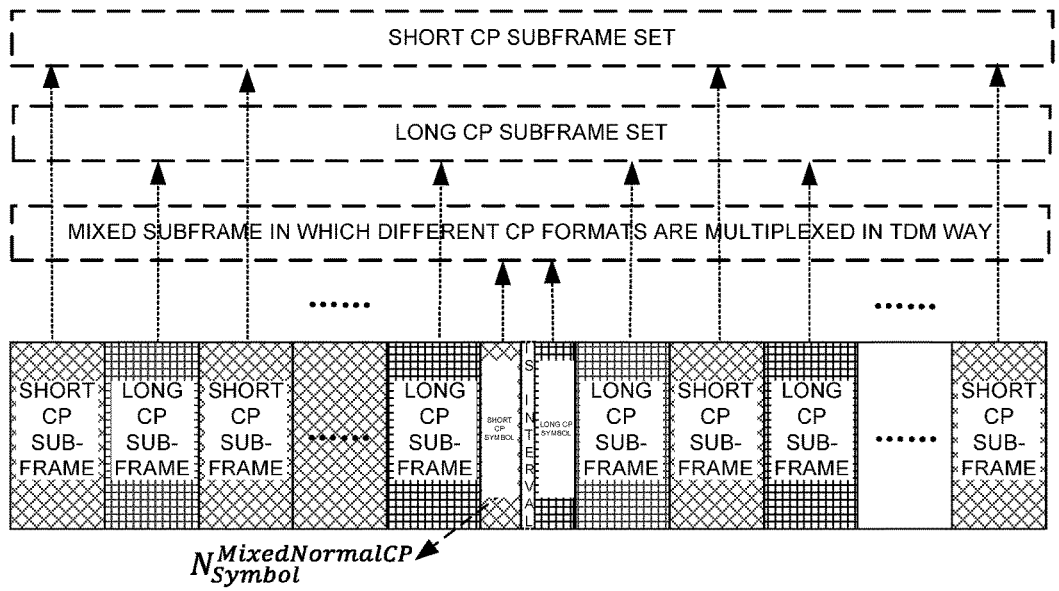
FIG. 5 illustratively shows a subframe format diagram according to Scheme 2-2 of the present disclosure, in which CP formats are configured based on respective subframe sets.

The subframe structure in this implementation is shown in FIG. 5, in which $N_{symbols}^{MixedNormalCP}$ represents the number of short CP symbols in a mixed subframe where signals of different CP formats coexist in the same subframe completely in the TDM way, and this parameter needs to be configured by the network to the D2D terminal for facilitating corresponding operations such as rate match of D2D transmitters.

Hence, when the base station notifies, via RRC signaling, the D2D terminals of the subframe sets configured by the base station, it also needs to notify the D2D terminals of CP lengths of corresponding subframe sets of these D2D terminals. As such, signaling for the subframe set configuration of the base station comprises:

1. time and frequency resources of subframe set 1, and a CP configuration format of the subframe set;
2. time and frequency resources of subframe set 2, and a CP configuration format of the subframe set;
3. a subframe number of the subframe in which the long CP signal and the short CP signal coexist, the number of SC-FDMA/OFDM symbols of the corresponding long CP signal or short CP signal, and corresponding positions thereof; e.g., in a simplified embodiment, i.e., the Specification specifies fixed relative positions of the long CP symbol and the short CP symbol (e.g., the long CP symbol follows the short CP symbol), and the Specification also specifies that the symbols where the long CP and the short CP are located are continuous respectively; and a serial number of the last short CP symbol in the mixed subframe is configured by the network.

It should be noted that in the mixed subframe in which the long CP signals or the short CP signals are multiplexed in the TDM way, if the symbols where the long and the short CPs are located are continuous without any interval respectively, intervals of several sampling points may occur between the long CP symbol and the short CP symbol in a time domain. In an example in which the long CP follows the short CP and respective short CP symbols are continuous without any interval (the same for the long CP), a time interval length between the short CP symbol and the long CP symbol should be (Duration of One Subframe—Time Lengths of All Long CP Symbols) mod One Short CP Time Length.

The signaling of subframe set configuration of the base station may be any combination of the three subframe or subframe sets 1, 2 and 3 as described previously.

It should be noted that such a configuration may be applicable to various scenarios in which the short CP signal and the long CP signal coexist in the same subframe, e.g., the cellular network data and the D2D data coexisting in different CP formats in the same subframe, or different D2D users enable their data to coexist in different CP formats in the same subframe.

The signaling may be transmitted to the D2D terminal by the base station in a form of dedicated RRC signaling, or may be broadcasted in a form of SIB message.

In addition, there may be three configuration schemes for Implementation 2-2. A first configuration scheme is universally configuring all of D2D channels in the cell, i.e., all of the channels in the cell can only be allocated to one of the subframe set 1 and the short CP resource in the mixed subframe, the subframe set 2 and the long CP resource in the mixed subframe. A second configuration scheme is dedicatedly configuring respective D2D channels, e.g., configuring a subframe set and a CP format of the subframe set for the discovery channel of some D2D terminal, or configuring a subframe set and a CP format of the subframe set for the SA channel of some D2D terminal. The third configuration scheme is configuring some set of CP formats for the specific D2D channel of each user in the cell, i.e., some channel of some user in the cell can only be allocated to one of the subframe set 1 of the channel resource pool and the short CP resource in the mixed subframe or the subframe set 2 and the long CP resource in the mixed subframe, and resource allocation for the same channel of the same user is not allowed to be performed across the resource pool subsets 1 and 2.

For the D2D transmitter, the resources for transmitting the signal are selected from the configured subframe set, and the CP format of the subframe set completely complies with such a configuration.

The D2D transmission terminal associated with the configuration may use the CP format configured by the network for the D2D signal transmitted on the corresponding subframe set; and the D2D reception terminal associated with the configuration may use the CP format obtained from the network notification for corresponding detection of the received signal.

Implementation 2-2 involves physical layer processes as follows:

The network may configure the corresponding configurations, such as the long CP subframe set, the short CP subframe set, the subframe number of the mixed subframe and the configuration information in the corresponding mixed subframe, including the long CP (or short CP) symbol set etc. (the information in the mixed subframe will be used for behaviors such as rate match of the D2D terminal transmitters), as previously described via the high layer RRC signaling (or a part of signaling being configured by DCI). Of course, the configuration information of the corresponding mixed subframe is notified by RRC or informed in the SA channel. These configurations may be notified to the D2D transmission terminal and the D2D reception terminal.

The D2D transmission terminal associated with the configuration may use the CP format configured by the network for the D2D signal transmitted on the corresponding subframe set.

The D2D reception terminal associated with the configuration may use the CP format obtained from the network notification for corresponding detection of the received signal.

In a word, on these resource pools of specific CP formats, both the D2D transmission terminal and the D2D reception terminal must restrict their D2D transmission and reception behaviors according to the CP formats configured on the corresponding subframe or subframe set.

Implementation 2-3

In Implementation 2-3, the base station configures subframe sets semi-statically for the D2D communication channel and the D2D discovery channel, which comprise:

1. a subframe set 1 with a short CP;
2. a subframe set 2 with a long CP;
3. a subframe in which one or two long CP signals and short CP signals coexist in a FDM form.

Figure 6:
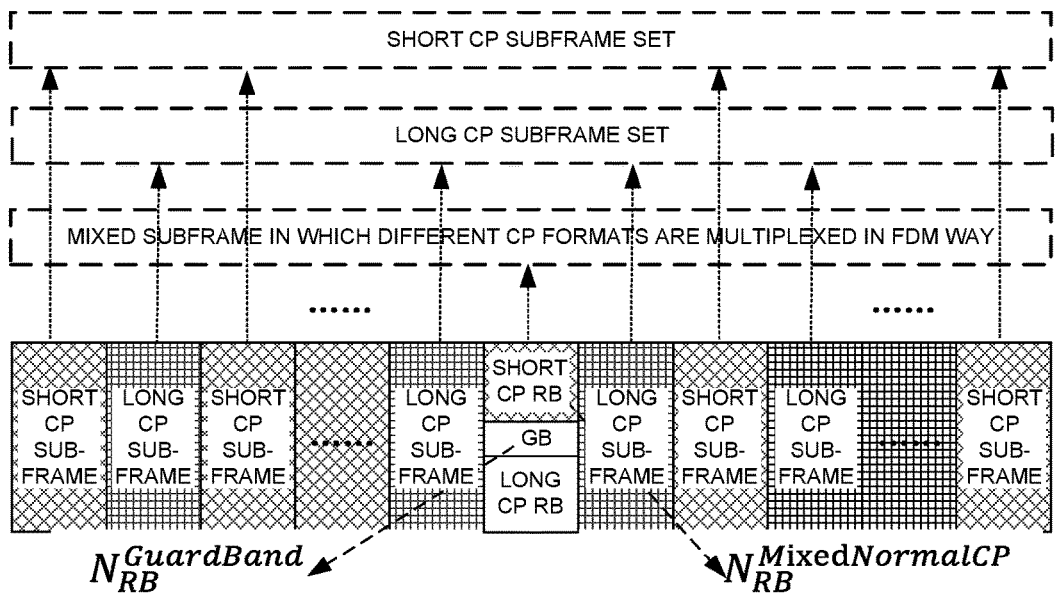
FIG. 6 illustratively shows a subframe format diagram according to Scheme 2-3 of the present disclosure, in which CP formats are configured based on respective subframe sets.

The subframe structure in this implementation is shown in FIG. 6, in which $N_{RB}^{MixedNormalCP}$ represents the number of PRBs of the short CP signal in the mixed subframe where signals of different CP formats coexist in the same subframe completely in the TDM way, and $N_{RB}^{GuardBand}$ represents the number of PRBs occupied by a guard band between the long CP signal and the short CP signal in the mixed subframe where the signals of different CP formats coexist in the same subframe completely in the TDM way. The two parameters need to be configured by the network to the D2D terminal for facilitating corresponding operations such as rate match of D2D transmitters.

Hence, when the base station notifies, via RRC signaling, the D2D terminals of the subframe sets configured by the base station, it also needs to notify the D2D terminals of CP lengths of these subframe sets. As such, signaling for the subframe set configuration of the base station comprises:

1. time and frequency resources of subframe set 1, and a CP configuration format of the subframe set;

2. time and frequency resources of subframe set 2, and a CP configuration format of the subframe set;

3. a subframe number of the subframe in which the long CP signal and the short CP signal coexist, the number of physical resource blocks of the corresponding long CP signal or short CP signal, and corresponding positions thereof; the number of physical resource blocks occupied by the guard band between the long CP and the short CP, and absolute or relative power of the long CP and the short CP. For example, in a simplified embodiment, i.e., the Specification may specify fixed relative positions of the long CP physical resource block and the short CP physical resource block (e.g., the short CP physical resource block is located at a relatively lower frequency, and the long CP physical resource block is located at a relatively higher frequency), and the Specification also specifies that the physical resource blocks where the long CP and the short CP are located are continuous respectively in a frequency domain. And a serial number of the last short CP physical resource block in the mixed subframe is configured by the network.

It should be noted that in the mixed subframe in which the long CP signals or the short CP signals are multiplexed in the FDM way, if the physical resource blocks where the long and the short CPs are located are continuous without any interval respectively, intervals of several sub-carriers may be needed between the long CP physical resource block and the short CP physical resource block in the frequency domain, i.e., the guard band signaling is transmitted to the D2D terminal by the base station in a form of dedicated RRC signaling, or is broadcast in a form of SIB message.

In addition, since respective requirements for dynamic ranges of received signals of the cellular network signal and the D2D signal may be up to 60 dB or even higher, suppression capability of the above sub-carrier interval in the frequency domain for inter-interference between the cellular network signal and the D2D signal, or different users or different D2D channels due to coexistence of different CP formats in the same subframe may not be able to reach the requirements for the dynamic ranges of the cellular network received signal or the D2D received signal, even if a very broad sub-carrier interval is used for separation. Thus, a power control mechanism may be used as auxiliary means, i.e., power of signals of different CP formats which coexist in the same subframe may be configured according to priorities of signals of which different CP formats coexist in the same subframe, e.g., a priority of the cellular network signal being higher than that of the D2D signal. Such signaling is also transmitted to the D2D terminal by the base station in a form of dedicated RRC signaling, or is broadcast in a form of SIB message.

Moreover, there may be three configuration schemes for Implementation 2-2. A first configuration scheme is universally configuring all of D2D channels in the cell, i.e., all of the channels in the cell can only be allocated to one of the subframe set 1 and the short CP resource in the mixed subframe, the subframe set 2 and the long CP resource in the mixed subframe. A second configuration scheme is dedicatedly configuring respective D2D channels, e.g., configuring a subframe set and a CP format of the subframe set for the discovery channel of some D2D terminal, or configuring a subframe set and a CP format of the subframe set for the SA channel of some D2D terminal. The third configuration scheme is configuring some set of CP formats for the specific D2D channel of each user in the cell, i.e., some channel of some user in the cell can only be allocated to one of the subframe set 1 of the channel resource pool and the short CP resource in the mixed subframe or the subframe set 2 and the long CP resource in the mixed subframe, and resource allocation for the same channel of the same user is not allowed to be performed across the resource pool subsets 1 and 2.

For the D2D transmitter, the resources for transmitting the signal are selected from the configured subframe set, and the CP format of the subframe set completely complies with such a configuration.

The D2D transmission terminal associated with the configuration may use the CP format configured by the network for the D2D signal transmitted on the corresponding subframe set; and the D2D reception terminal associated with the configuration may use the CP format obtained from the network notification for corresponding detection of the received signal.

Implementation 2-3 involves physical layer processes as follows:

The network may configure the corresponding configurations, such as the long CP subframe set, the short CP subframe set, the subframe number of the mixed subframe and the configuration information in the corresponding mixed subframe, including the long CP (or short CP) PRB set, and the guard band PRB set, and power information of the short CP signal PRB set and the long CP signal PRB set, etc. as previously described via the high layer RRC signaling (or via the DCI). Of course, the configuration information of the corresponding mixed subframe is notified by RRC or informed in the SA channel. These configurations may be notified to the D2D transmission terminal and the D2D reception terminal.

The D2D transmission terminal associated with the configuration may use the CP format configured by the network for the D2D signal transmitted on the corresponding subframe set.

The D2D reception terminal associated with the configuration may use the CP format obtained from the network notification for corresponding detection of the received signal.

In a word, on these resource pools of specific CP formats, both the D2D transmission terminal and the D2D reception terminal must restrict their D2D transmission and reception behaviors according to the CP formats configured on the corresponding subframe or subframe set.

Implementation 2-4

In Implementation 2-4, the base station configures subframe sets semi-statically for the D2D communication channel and the D2D discovery channel, which comprise:

1. a subframe set 1 with a short CP;

2. a subframe set 2 with a long CP;

3. a subframe in which one or two long CP signals and short CP signals coexist in a TDM&FDM form.

Figure 7:
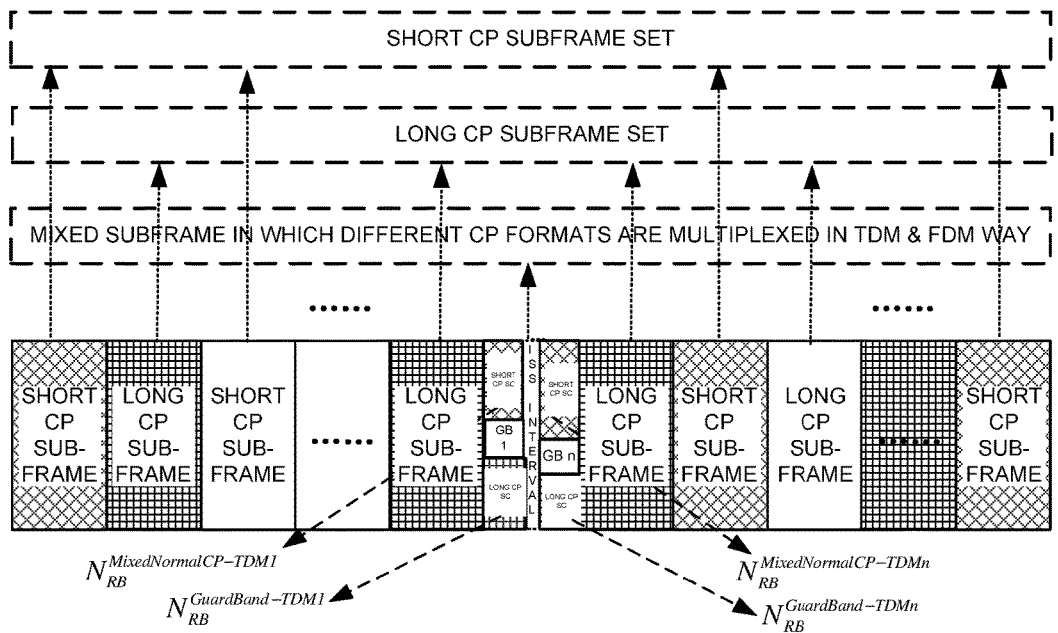
FIG. 7 illustratively shows a subframe format diagram according to Scheme 2-4 of the present disclosure, in which CP formats are configured based on respective subframe sets, and two symbol sets are included in a mixed subframe.

The subframe structure in this implementation is shown in FIG. 7, in which $N_{RB}^{MixedNormalCP\text{-}TDM1}$ represents the number of PRBs of the short CP signal of a first set of TDM symbols in some mixed subframe where signals of different CP formats coexist in the same subframe completely in the TDM way, $N_{RB}^{GuardBand\text{-}TDM1}$ represents the number of PRBs occupied by a guard band between the long CP signal and the short CP signal of the first set of TDM symbols in some mixed subframe where the signals of different CP formats coexist in the same subframe completely in the TDM way, and so on . . . , $N_{RB}^{MixedNormalCP\text{-}TDMn}$ represents the number of PRBs of the short CP signal of a n-th set of TDM symbols in the mixed subframe where signals of different CP formats coexist in the same subframe completely in the TDM way, $N_{RB}^{GuardBand-TDMn}$ represents the number of PRBs occupied by a guard band between the long CP signal and the short CP signal of the n-th set of TDM symbols in the mixed subframe where the signals of different CP formats coexist in the same subframe completely in the TDM way. These parameters need to be configured by the network to the D2D terminal for facilitating corresponding operations such as rate match of D2D transmitters.

In Implementation 2-4, a format of the mixed subframe in which the short CP signal and the long CP signal coexist in the TDM&FDM way is defined in detail. Here, it is specifically illustrated that the symbols multiplexed in the TDM way within each timeslot of the TDM&FDM mixed subframe are two to six sets, two adjacent sets are separated in the TDM way, and the signals of different CP formats within each set of symbols are multiplexed in the FDM way. That is, if there are two sets of TDM symbols, there must be one inter-symbol gap between the two sets; and if there are more than two sets of TDM symbols, there is at least one inter-symbol gap between respective TDM symbol sets within each timeslot of each TDM&FDM mixed subframe, but an inter-symbol gap is not necessarily exists between any two of adjacent sets. The inter-symbol gap occupies the whole frequency band in the frequency domain.

Also, the SC-FDMA/OFDM signals of two CP formats may be multiplexed in the FDM way in each of two to six TDM symbol sets within each timeslot if the symbol sets are divided per timeslot in the TDM&FDM mixed subframe, or in each of two to thirteen TDM symbol sets within each subframe if the symbol sets are divided per subframe in the mixed subframe. Such multiplexed SC-FDMA/OFDM signals of two CP formats in the FDM way may have different periods of sampling points in the time domain, i.e., within each SC-FDMA/OFDM symbol set separated in the TDM way, the SC-FDMA/OFDM signals of the two CP formats multiplexed in the FDM way may not be aligned in the time domain, i.e., in FIG. 7, within the TDM&FDM mixed subframe as shown in FIG. 7, in some SC-FDMA/OFDM symbol set which is multiplexed with other SC-FDMA/OFDM symbol sets in the TDM way, the number of sampling points of Normal CP PRBs and that of Extended CP PRBs which are multiplexed in the FDM way are not consistent with each other. During a period of a longer one of the both, no signal may be transmitted on the time-frequency resources whose time interval is a period during which the signal of the longer one is normally transmitted while the signal of the shorter one is not transmitted, i.e., a difference between transmission of the signal of the longer one and transmission of the signal of the shorter one, in the time domain and whose frequency band is where the shorter one is located in the frequency domain. It should be noted that the gap occupies, in the frequency domain, the frequency band which is occupied by a shorter one of the TDM symbol set in the time domain.

Figure 8:
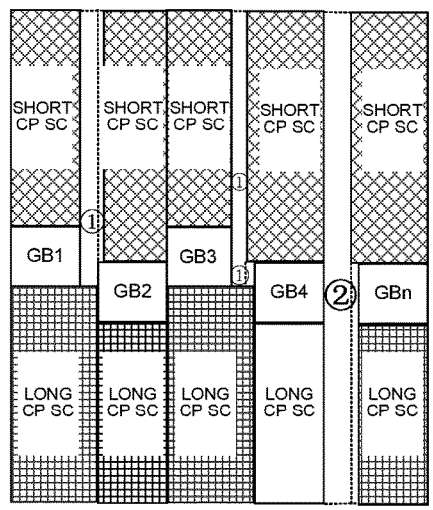
FIG. 8 illustratively shows a subframe format diagram according to Scheme 2-4 of the present disclosure, in which CP formats are configured based on respective subframe sets, and five symbol sets are included in a mixed subframe.

Therefore, blank resources within the TDM&FDM mixed subframe on which no signal can be transmitted are constituted by both the time-frequency resources which are emptied due to unalignment within the TDM symbol set (the gap occupying, in the frequency domain, the frequency band which is occupied by the short one of the TDM symbol set in the time domain, as shown in ① of FIG. 8) and the gaps which may be exist between the sets (the gap occupying the whole frequency band in the frequency domain, as shown in ② of FIG. 8).

Hence, when the base station notifies, via RRC signaling, the D2D terminals of the subframe sets configured by the base station, it also needs to notify the D2D terminals of CP lengths of these subframe sets and the corresponding configurations of respective mixed subframes. As such, signaling for the subframe set configuration of the base station comprises:

1. time and frequency resources of subframe set 1, and a CP configuration format of the subframe set;
2. time and frequency resources of subframe set 2, and a CP configuration format of the subframe set;
3. a subframe number of the subframe in which the long CP signal and the short CP signal coexist, corresponding respective TDM symbol sets, the number of sub-carriers of the long CP signals or short CP signals which are multiplexed in the FDM way in the respective TDM symbol sets, and corresponding positions thereof; the number of sub-carriers within the period of the symbol set occupied by the guard band between the long CP and the short CP, and absolute or relative power of the long CP and the short CP. For example, in a simplified embodiment, i.e., the Specification may specify fixed relative positions of the long CP sub-carrier and the short CP sub-carrier in each of the TDM symbol sets (e.g., the short CP sub-carrier is located at a relatively lower frequency, and the long CP sub-carrier is located at a relatively higher frequency), and the Specification also specifies that the sub-carrier sets in the period of each symbol set where the long CP and the short CP are located are continuous respectively in the frequency domain. And a serial number of the last short CP sub-carrier within each of the TDM symbol sets in the mixed subframe is configured by the network. And, for the mixed subframe in which the long CP or the short CP signal coexist, the Specification specifies the fixed relative positions of the long CP symbol and the short CP symbol (e.g., the long CP symbol follows the short CP symbol) in the mixed subframe, and specifies that there is one mixed symbol in which the short CP and the long CP are multiplexed in the FDM way immediately following the short CP symbol. In this mixed symbol, the Specification also specifies that the sub-carrier sets in which the long CP and the short CP are located are continuous respectively. And a serial number of the last short CP sub-carrier set in the mixed symbol is configured by the network.

It should be noted that in the mixed symbol of the TDM&FDM mixed subframe of the long CP signal or the short CP signal, if the sub-carrier sets where the long and the short CPs are located are continuous without any interval respectively, the interval of several sub-carriers may be needed between the long CP sub-carrier set and the short CP sub-carrier set in the frequency domain, i.e., the guard band.

Such signaling is transmitted to the D2D terminal by the base station in a form of dedicated RRC signaling, or is broadcast in a form of SIB message.

In addition, since respective requirements for dynamic ranges of received signals of the cellular network signal and the D2D signal may be up to 60 dB or even higher, suppression capability of the above sub-carrier interval in the frequency domain for inter-interference between the cellular network signal and the D2D signal, or different users or different D2D channels due to coexistence of different CP formats in the same symbol set may not be able to reach the requirements for the dynamic ranges of the cellular network received signal or the D2D received signal, even if a very broad sub-carrier interval is used for separation. Thus, a power control mechanism may be used as auxiliary means, i.e., power of signals of different CP formats which coexist in the same symbol set may be configured according to priorities of signals of which different CP formats coexist in the same symbol set, e.g., a priority of the cellular network signal being higher than that of the D2D signal. Such signaling is also transmitted to the D2D terminal by the base station in a form of dedicated RRC signaling, or is broadcast in a form of SIB message.

Moreover, there may be three configuration schemes for Implementation 2-2. A first configuration scheme is universally configuring all of D2D channels in the cell, i.e., all of the channels in the cell can only be allocated to one of the subframe set 1 and the short CP resource in the mixed subframe, the subframe set 2 and the long CP resource in the mixed subframe. A second configuration scheme is dedicatedly configuring respective D2D channels, e.g., configuring a subframe set and a CP format of the subframe set for the discovery channel of some D2D terminal, or configuring a subframe set and a CP format of the subframe set for the SA channel of some D2D terminal. The third configuration scheme is configuring some set of CP formats for the specific D2D channel of each user in the cell, i.e., some channel of some user in the cell can only be allocated to one of the subframe set 1 of the channel resource pool and the short CP resource in the mixed subframe or the subframe set 2 and the long CP resource in the mixed subframe, and resource allocation for the same channel of the same user is not allowed to be performed across the resource pool subsets 1 and 2.

For the D2D transmitter, the resources for transmitting the signal are selected from the configured subframe set, and the CP format of the subframe set completely complies with such a configuration.

The D2D transmission terminal associated with the configuration may use the CP format configured by the network for the D2D signal transmitted on the corresponding subframe set; and the D2D reception terminal associated with the configuration may use the CP format obtained from the network notification for corresponding detection of the received signal.

Implementation 2-4 involves physical layer processes as follows:

The network may configure the corresponding configurations, such as the long CP subframe set, the short CP subframe set, the subframe number of the mixed subframe and the configuration information in the corresponding mixed subframe, including the long CP (or short CP) PRB set, and the long CP (or the short CP) symbol set of the mixed symbol in the mixed subframe, and the short CP signal (or the long CP signal) PRB set of the mixed symbol in the mixed subframe, the time-frequency resource and power information of the guard band PRB set, etc. as previously described via the high layer RRC signaling (or a part of signaling is configured by the DCI). Of course, the configuration information of the corresponding mixed subframe is notified by RRC or informed in the SA channel. These configurations may be notified to the D2D transmission terminal and the D2D reception terminal.

The D2D transmission terminal associated with the configuration may use the CP format configured by the network for the D2D signal transmitted on the corresponding subframe set.

The D2D reception terminal associated with the configuration may use the CP format obtained from the network notification for corresponding detection of the received signal.

In a word, on these resource pools of specific CP formats, both the D2D transmission terminal and the D2D reception terminal must restrict their D2D transmission and reception behaviors according to the CP formats configured on the corresponding subframe or subframe set.

Implementation 2-5

The base station configures time-frequency physical resource sets semi-statically for the D2D communication channel and the D2D discovery channel, which comprise:

1. a time-frequency physical resource set with a short CP;
2. a time-frequency physical resource set with a long CP.

Hence, when the base station notifies, via RRC signaling, the D2D terminals of the time-frequency physical resource sets configured by the base station, it also needs to notify the D2D terminals of CP lengths of these time-frequency physical resource sets. As such, signaling for the time-frequency physical resource set configuration of the base station comprises:

1. time and frequency resources of time-frequency physical resource set 1, and a CP configuration format of the time-frequency physical resource set;
2. time and frequency resources of time-frequency physical resource set 2, and a CP configuration format of the time-frequency physical resource set.

Figure 9:
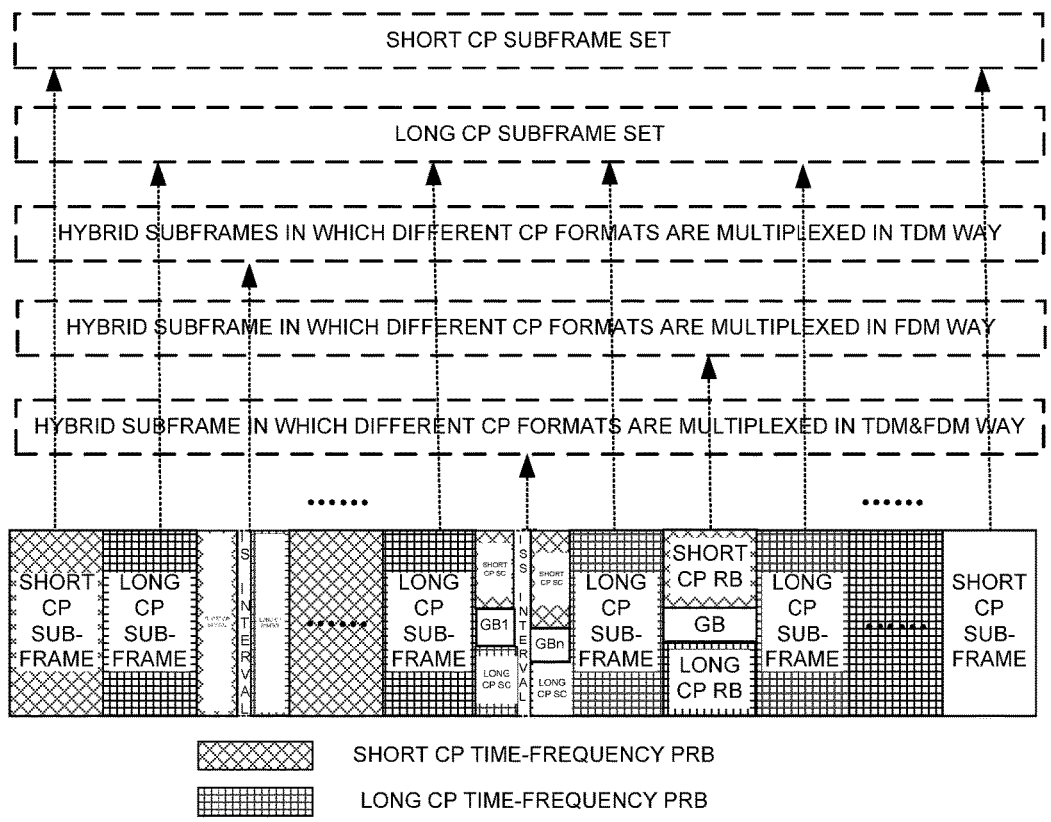
FIG. 9 illustratively shows a subframe and PRB format diagram according to Scheme 2-5 of the present disclosure, in which CP formats are configured based on respective time-frequency physical resource sets.

With the configurations of time-frequency physical resource sets of two CP formats used in Implementation 2-5, a subframe format in the subframe set of each CP format and a subframe format of the mixed subframe in which the short CP signal and the long CP signal coexist are shown in FIG. 9.

FIG. 9 is a subframe and PRB format diagram, in which CP formats are configured based on respective time-frequency physical resource sets; symbol sets which are multiplexed in the TDM way are grouped in each timeslot of the mixed subframe, or are grouped in each mixed subframe. If they are grouped in each timeslot of the mixed subframe, there are two to six sets of symbols multiplexed in the TDM way within each timeslot of the TDM&FDM mixed subframe (only two sets are shown in FIG. 9 for simplicity); if they are grouped in the mixed subframe, there are two to thirteen sets of symbols multiplexed in the TDM way in the TDM&FDM mixed subframe. In any of the both cases, two adjacent sets are separated in the TDM way, and the signals of different CP formats in each set of symbols may be multiplexed in the FDM way. With such a configuration mode in which the CP formats are configured according to the time-frequency physical resource sets, there may be random PRB combination ways of coexistence of the long CP and the short CP, i.e., the long CP and the short CP may coexist based on any of subframe configuration schemes 2-1, 2-2, 2-3 and 2-4. That is, the subframe where the short CP (or the long CP) time-frequency physical resource set is located in the time-frequency physical resource set may be any of subframes in Schemes 2-1, 2-2, 2-3 and 2-4.

And in this configuration mode, the short CP signal and the long CP signal may coexist in the TDM form, or the FDM form or the TDM&FDM form in each mixed subframe in which the short CP signal and the long CP signal coexist.

The format of the mixed subframe in which the short CP signal and the long CP signal may coexist in the TDM form has been described in detail in Implementation 2-2.

The format of the mixed subframe in which the short CP signal and the long CP signal may coexist in the FDM form has been described in detail in Implementation 2-3.

The format of the mixed subframe in which the short CP signal and the long CP signal may coexist in the TDM&FDM form has been described in detail in Implementation 2-4. Here, it is specifically illustrated that the symbols multiplexed in the TDM way within each timeslot of the TDM&FDM mixed subframe are two to six sets, two adjacent sets are separated in the TDM way, and the signals of different CP formats within each set of symbols are multiplexed in the FDM way. That is, if there are two sets of TDM symbols, there must be one inter-symbol gap between the two sets; and if there are more than two sets of TDM symbols, there is at least one inter-symbol gap between respective TDM symbol sets within each timeslot of each TDM&FDM mixed subframe, but an inter-symbol gap is not necessarily exists between any two of adjacent sets. The inter-symbol gap occupies the whole frequency band in the frequency domain.

Also, the SC-FDMA/OFDM signals of two CP formats may be multiplexed in the FDM way in each of two to six TDM symbol sets within each timeslot if the symbol sets are divided per timeslot in the TDM&FDM mixed subframe, or in each of two to thirteen TDM symbol sets within each subframe if the symbol sets are divided per subframe in the mixed subframe. Such multiplexed SC-FDMA/OFDM signals of two CP formats in the FDM way may have different periods of sampling points in the time domain, i.e., within each SC-FDMA/OFDM symbol set separated in the TDM way, the SC-FDMA/OFDM signals of the two CP formats multiplexed in the FDM way may not be aligned in the time domain, i.e., in FIG. 9, within the TDM&FDM mixed subframe as shown in FIG. 9, in some SC-FDMA/OFDM symbol set which is multiplexed with other SC-FDMA/OFDM symbol sets in the TDM way, the number of sampling points of Normal CP PRBs and that of Extended CP PRBs which are multiplexed in the FDM way are not consistent with each other. During a period of a longer one of the both, no signal may be transmitted on the time-frequency resources whose time interval is a period during which the signal of the longer one is normally transmitted while the signal of the shorter one is not transmitted, i.e., a difference between transmission of the signal of the longer one and transmission of the signal of the shorter one, in the time domain and whose frequency band is where the shorter one is located in the frequency domain. It should be noted that the gap occupies, in the frequency domain, the frequency band which is occupied by a shorter one of the TDM symbol set in the time domain.

Therefore, blank resources within the TDM&FDM mixed subframe on which no signal can be transmitted are constituted by both the time-frequency resources which are emptied due to non-alignment within the TDM symbol set (the gap occupying, in the frequency domain, the frequency band which is occupied by the short one of the TDM symbol set in the time domain, as shown in ① of FIG. 8) and the gaps which may be exist between the sets (the gap occupying the whole frequency band in the frequency domain, as shown in ② of FIG. 8).

The signaling for the time-frequency physical source set configuration of the base station may be one of the above signaling 1 and 2 or both.

The signaling may be transmitted to the D2D terminal by the base station in a form of dedicated RRC signaling, or may be broadcast in a form of SIB message.

If the implementation will be standardized in the Standard, it is required to determine whether the signals of different CP formats which are multiplexed in the FDM way in each of the TDM symbol sets are left-aligned or right-aligned in time, and to specify in the Specification which of the signals of the long CP format and the short CP format is longer, in order to reduce signaling overhead. As such, for information in the time domain of this scheme, the signaling only needs to notify the number of symbols of the long CP signal (or the short CP signal) of each TDM symbol set. Of course, for information in the frequency domain of this scheme, it is also required to determine the relative positions of the long CP format signal and the short CP format signal on the frequency band, and a start position of the guard band in the frequency domain and the bandwidth thereof, in order to reduce the signaling overhead. As such, the signaling only needs to notify the bandwidth of the long CP signal (or the short CP signal) of each TDM symbol set, and the bandwidth of the guard band.

In addition, there may be three configuration schemes for Implementation 2-5. A first configuration scheme is universally configuring all of D2D channels in the cell, i.e., each kind of channel can only be allocated to one of the time-frequency physical resource set 1 and the time-frequency physical resource set 2. A second configuration scheme is dedicatedly configuring respective D2D channels of all D2D terminals in the cell, e.g., configuring a time-frequency physical resource set and a CP format of the time-frequency physical resource set for the discovery channel of all the D2D terminals in the cell, or configuring a time-frequency physical resource set and a CP format of the time-frequency physical resource set for the SA channel of all the D2D terminals in the cell, or configuring a time-frequency physical resource set and a CP format of the time-frequency physical resource set for the D2D transmission channel of all the D2D terminals in the cell, etc. The third configuration scheme is dedicatedly configuring respective D2D channels of respective D2D terminals in the cell, e.g., configuring a subframe set and a CP format of the subframe set for the discovery channel of some D2D terminal in the cell, or configuring a subframe set and a CP format of the subframe set for the SA channel of some D2D terminal in the cell, or configuring a time-frequency physical resource set and a CP format of the time-frequency physical resource set for the D2D transmission channel of some D2D terminal in the cell. In a word, some D2D channel of some D2D terminal can only be configured in one of the resource pools of two different CP formats of the D2D channel in the cell, and some D2D channel of some D2D terminal is not allowed to be carried across resource pools of different CP formats.

For the D2D transmitter, the resources for transmitting the signal are selected from the configured time-frequency physical resource set, and the CP format of the time-frequency physical resource set completely complies with such a configuration.

The D2D transmission terminal associated with the configuration may use the CP format configured by the network for the D2D signal transmitted on the corresponding time-frequency physical resource block set; and the D2D reception terminal associated with the configuration may use the CP format obtained from the network notification for corresponding detection of the received signal.

Implementation 2-5 involves physical layer processes as follows:

The network may configure the corresponding configurations, such as the long CP subframe set, the short CP subframe set, the subframe number of the mixed subframe and the configuration information in the corresponding mixed subframe, including the long CP (or short CP) symbol set, and the long CP (or the short CP) symbol set of the mixed symbol in the mixed subframe, and the short CP signal PRB set, the long CP signal PRB set of the mixed symbol in the mixed subframe, the time-frequency resource and power information of the guard band PRB set, etc. as previously described via the high layer RRC signaling. Of course, the configuration information of the corresponding mixed subframe may be informed in the SA channel, besides being notified by RRC. These configurations may be notified to the D2D transmission terminal and the D2D reception terminal.

The D2D transmission terminal associated with the configuration may use the CP format configured by the network for the D2D signal transmitted on the corresponding subframe set.

The D2D reception terminal associated with the configuration may use the CP format obtained from the network notification for corresponding detection of the received signal.

Figure 10:
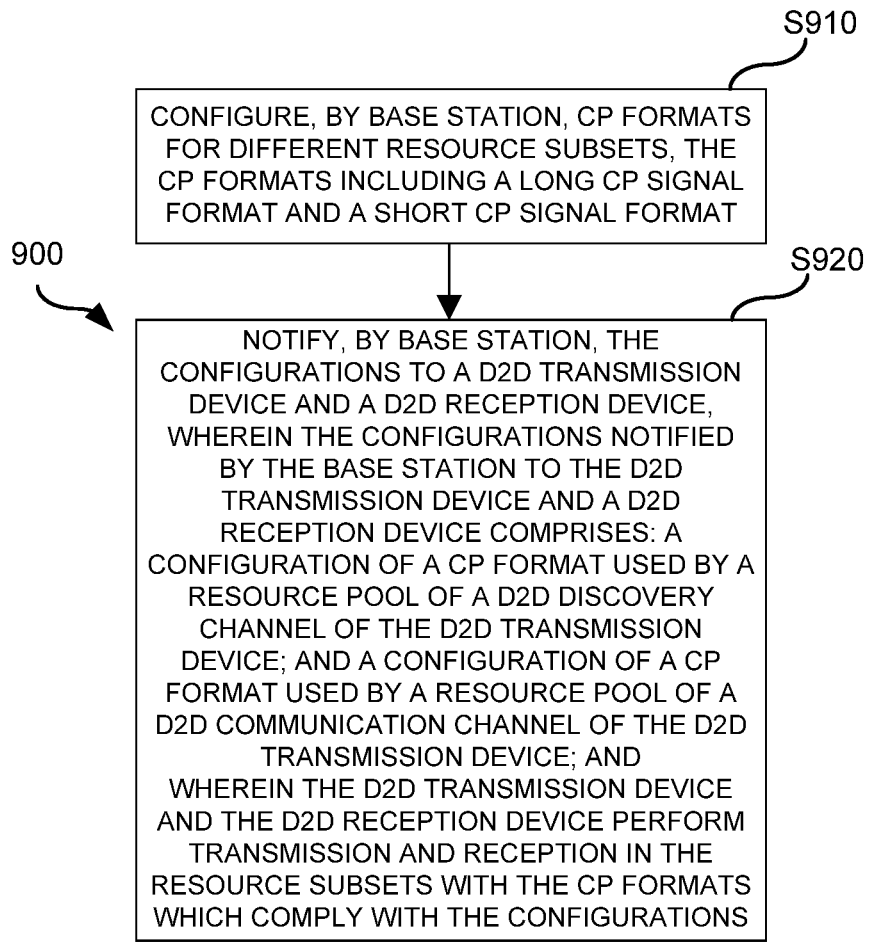
FIG. 10 illustratively shows a flowchart of a method of performing CP configuration on resources of D2D communication according to the present disclosure.

In summary, the present disclosure generally provides a method of performing CP configurations on resources of D2D communication, which comprises steps as shown in FIG. 10. In particular, in step S910, the base station configures CP formats for different resource subsets, the CP formats including a long CP signal format and a short CP signal format. In step S920, the base station notifies the configuration to a D2D transmission device and a D2D reception device, wherein the configuration notified by the base station to the D2D transmission device and a D2D reception device comprises: a configuration of a CP format used by a resource pool of a D2D discovery channel of the D2D transmission device; and a configuration of a CP format used by a resource pool of a D2D communication channel of the D2D transmission device; and wherein the D2D transmission device and the D2D reception device perform transmission and reception in the resource subsets with the CP formats which comply with the configuration.

Figure 11:
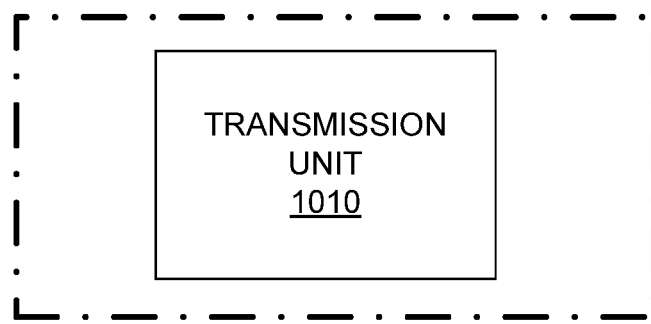
FIG. 11 illustratively shows a structure diagram of a base station according to the present disclosure.

FIG. 11 shows a block diagram of a base station 1000 according to the present disclosure. As shown in FIG. 11, the base station 1000 comprises a transmission unit 1010, configured to transmit Cyclic Prefix CP formats of resource pools via high layer signaling, the resource pools including a resource pool of a Device to Device D2D discovery channel and/or a resource pool of a D2D communication channel. The CP formats may include a long CP signal format and a short CP signal format.

The above descriptions are merely particular embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure as defined by the claims and their equivalents.

We claim:

1. A base station, comprising:
    configuration circuitry that configures (i) a plurality of Cyclic Prefix (CP) lengths for a resource pool for Device to Device (D2D) communication, and (ii) a plurality of subframe sets corresponding to respective ones of the plurality of CP lengths; and
    transmission circuitry that transmits information which indicates the configured plurality of CP lengths and the configures plurality of subframe sets corresponding to the respective ones of the plurality of CP lengths.

2. The base station of claim 1, wherein the configured plurality of CP lengths are transmitted by System Information Block (SIB) and/or dedicated Radio Resource Control (RRC) signal.

3. The base station of claim 1, wherein the configured plurality of CP lengths are used for scheduling assignment transmission and/or data transmission.

4. A user equipment (UE), comprising:
    reception circuitry that receives (i) a plurality of Cyclic Prefix (CP) length configurations for a resource pool for Device to Device (D2D) communication, and (ii) a plurality of subframe set configurations corresponding to respective ones of the plurality of CP length configurations; and
    determination circuitry that determines a plurality of CP lengths for the resource pool based on the received plurality of CP length configurations and determines a plurality of subframe sets corresponding to the respective ones of the plurality of CP length configurations based on the received plurality of subframe set configurations.

5. The UE of claim 4, wherein the plurality of CP length configurations are configured by System Information Block (SIB) and/or dedicated Radio Resource Control (RRC) signal.

6. The UE of claim 4, wherein the plurality of CP lengths are used for scheduling assignment transmission and/or data transmission.

* * * * *